United States Patent
Chelgren

[11] Patent Number: 6,149,169
[45] Date of Patent: Nov. 21, 2000

[54] CASTER FORK WITH DAMPENER

[75] Inventor: Eric Mark Chelgren, Vinton, Iowa

[73] Assignee: Frog Legs, Inc., Vinton, Iowa

[21] Appl. No.: 09/056,421

[22] Filed: Apr. 7, 1998

Related U.S. Application Data

[60] Provisional application No. 60/043,440, Apr. 8, 1997.

[51] Int. Cl.[7] ...................................................... B60G 1/00
[52] U.S. Cl. ........................................... 280/86.1; 280/647
[58] Field of Search .......................... 16/35 D, 44, 18 R, 16/45; 180/907; 280/250.1, 647, 86.1, 47.26, 38; 267/153, 141, 257, 258

[56] References Cited

U.S. PATENT DOCUMENTS

| | | |
|---|---|---|
| D. 347,162 | 5/1994 | Simonsen . |
| 1,745,992 | 2/1930 | Herold . |
| 2,306,179 | 12/1942 | Mulholland . |
| 2,442,831 | 6/1948 | Suttles . |
| 3,924,292 | 12/1975 | Christensen .............................. 16/35 R |
| 4,351,541 | 9/1982 | Propst et al. ............................. 280/408 |
| 4,360,213 | 11/1982 | Rudwick et al. . |
| 4,462,138 | 7/1984 | Black . |
| 4,485,521 | 12/1984 | Welsch et al. . |
| 4,559,669 | 12/1985 | Bonzer et al. . |
| 4,575,896 | 3/1986 | Nakao et al. . |
| 4,685,174 | 8/1987 | Hager . |
| 4,989,920 | 2/1991 | Kauzlarich . |
| 5,305,496 | 4/1994 | Gagnon et al. . |
| 5,400,469 | 3/1995 | Simmonsen ................................ 16/44 |
| 5,403,031 | 4/1995 | Gottschalk et al. . |
| 5,448,796 | 9/1995 | Larson . |
| 5,493,755 | 2/1996 | Kindstrand . |
| 5,848,658 | 12/1998 | Pulver ..................................... 180/65.1 |

OTHER PUBLICATIONS

Albion Shock Absorbing Casters, Grainger Co. Catalog, p. 2117.
Front Casters and Hardware, Invacare Corp. Catalog, p. 33.

*Primary Examiner*—Brian L. Johnson
*Assistant Examiner*—Tony Winner
*Attorney, Agent, or Firm*—Allan L. Harms

[57] ABSTRACT

A suspension fork for caster wheels providing shock absorption, comfort and safety while maintaining the original castering characteristics. A fork supporting a wheel on an axle is allowed to pivot about a second axle or pin located at the opposite end of the fork, forward and above the trailing wheel. The forward pivot is housed inside an upper block, which acts as a mounting fixture to the desired vehicle. A stem bolt protrudes from the upper block into the vehicle's caster housing containing bearings providing sideways rotation for steering purposes. The pivoting action of the fork and wheel about the upper block is controlled by a spring/dampener of polymer seated between the two blocks. Rigid tabs or mechanical lock outs limit the range of fork pivot and capture the elastomeric material until the forward pin is removed. Standardized axle and stem bolt dimensions allow the suspension caster to readily replace a conventional rigid caster fork.

9 Claims, 5 Drawing Sheets

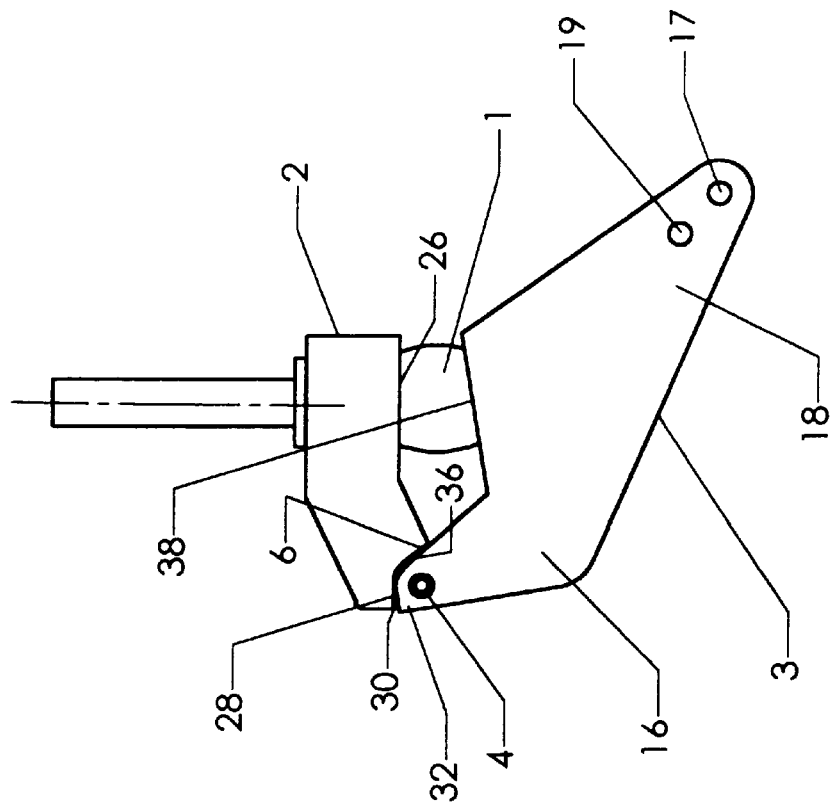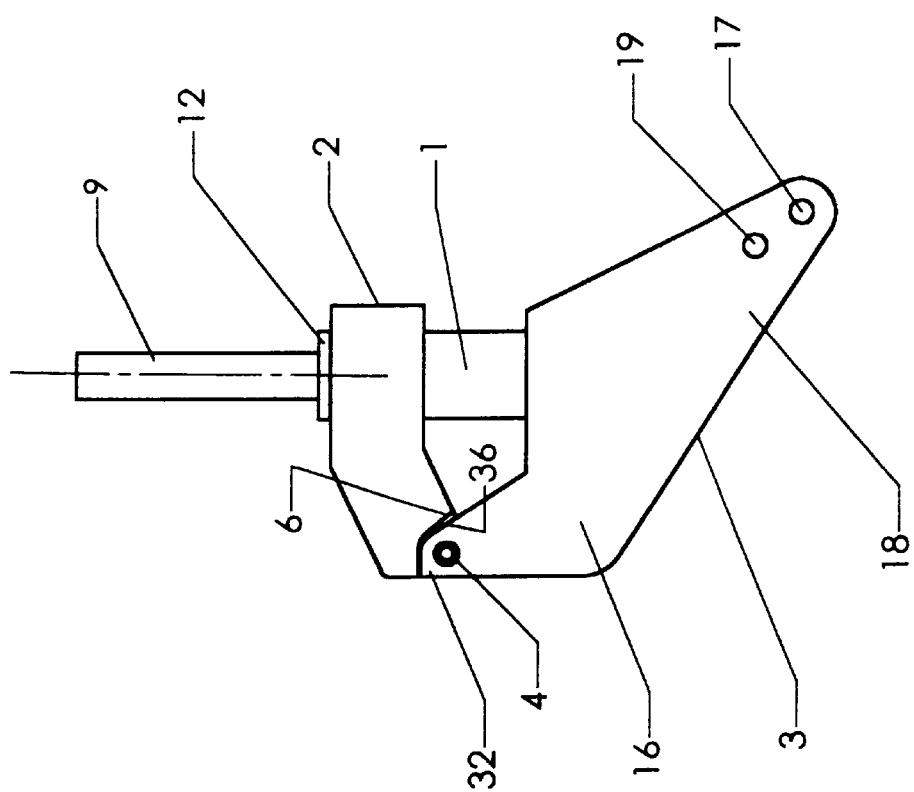

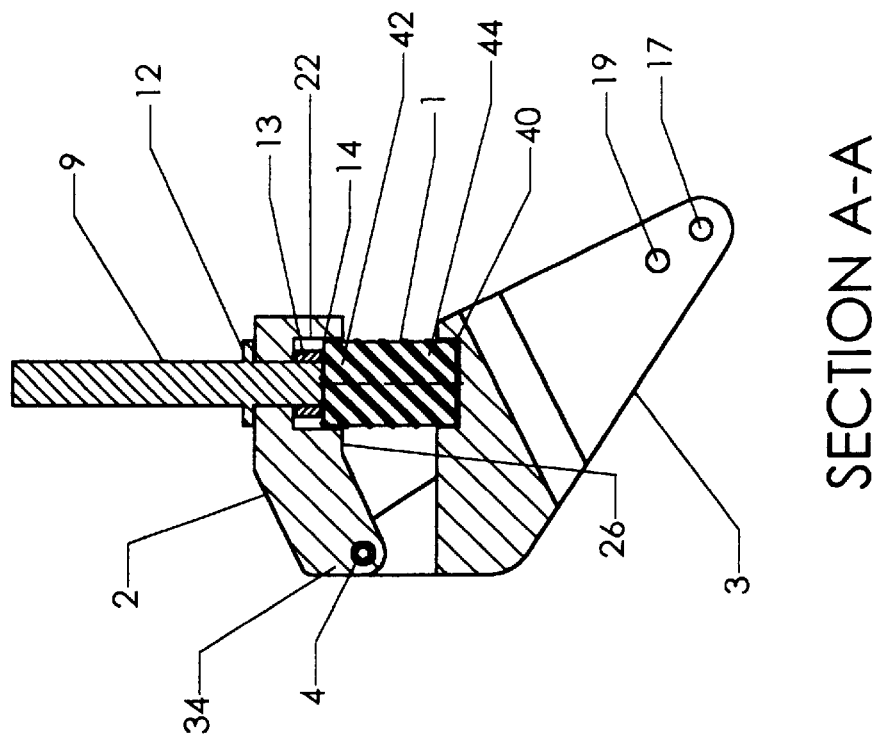
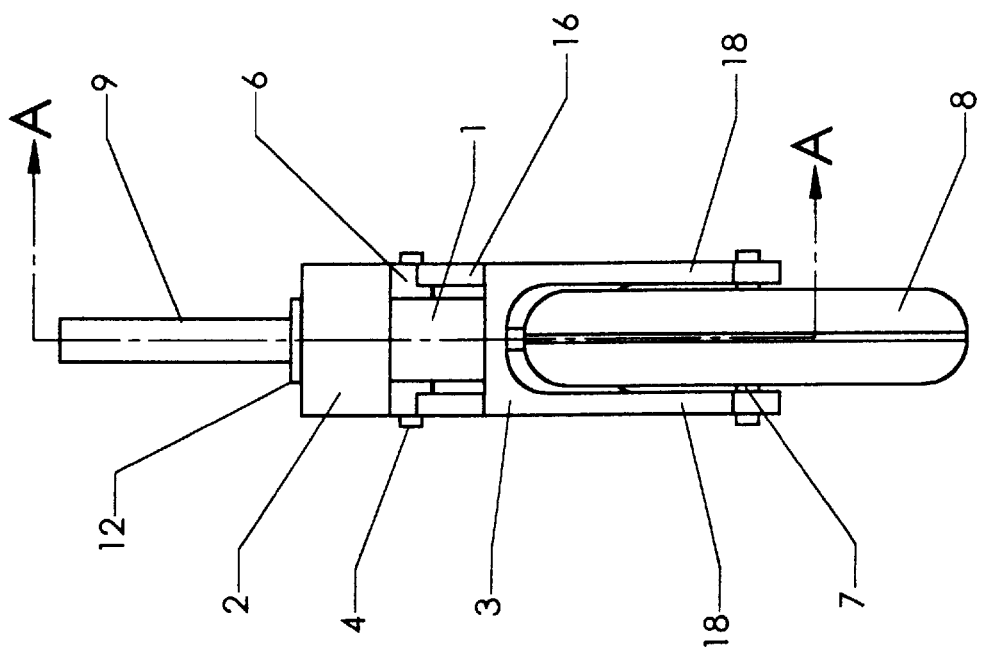

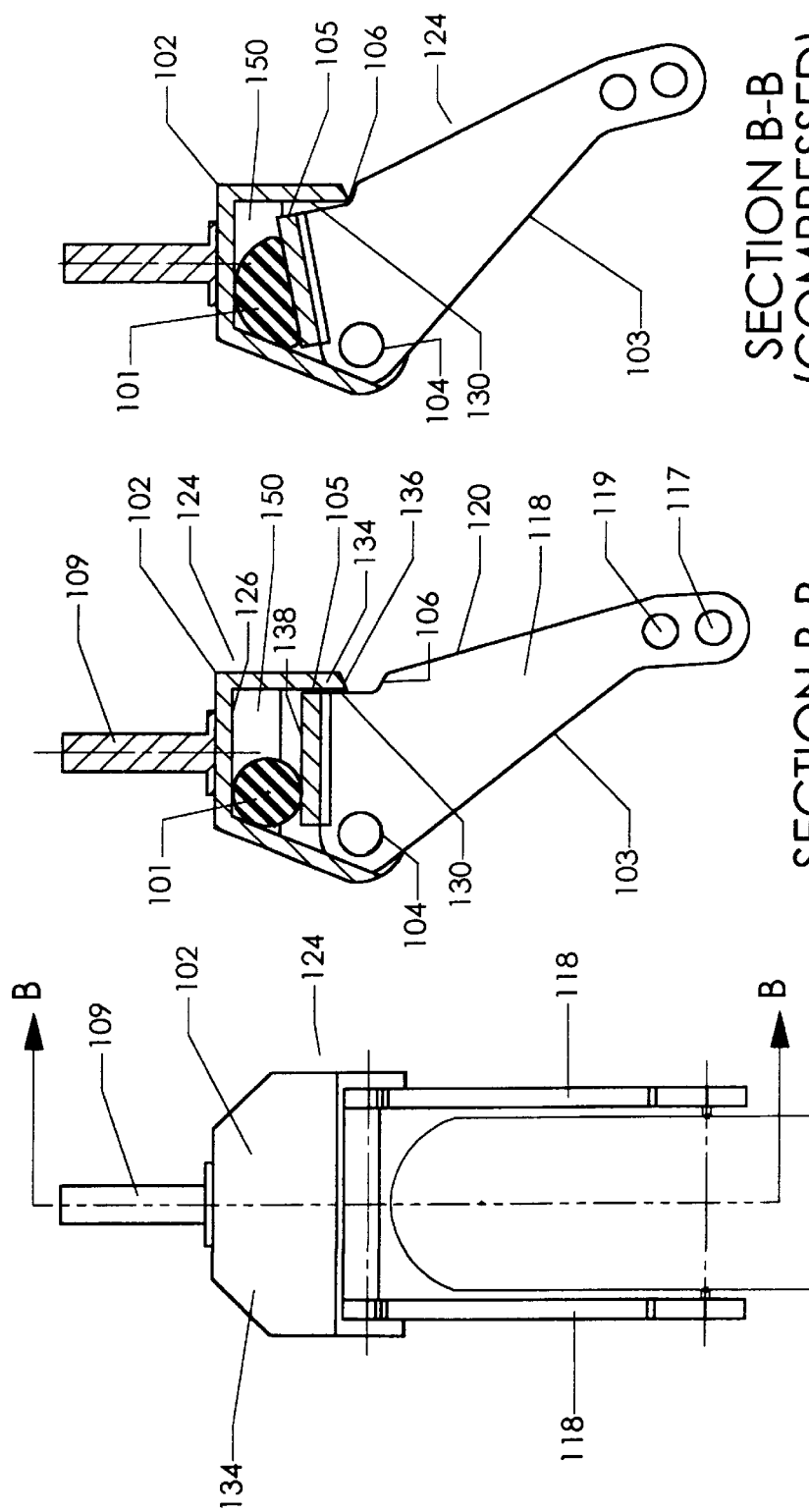

CASTER FORK WITH DAMPENER

CROSS REFERENCE TO CO-PENDING PROVISIONAL APPLICATION

This application is converted from copending provisional patent application entitled "Wheelchair Caster With Dampener", serial No. 60/043,440, filed Apr. 8, 1997. The contents of serial No. 60/043,440 are incorporated in this application.

BACKGROUND OF THE INVENTION

In the field of health care mobility and transportation of vibration sensitive or heavy duty devices, there is a need for wheelchairs, gurneys, stretchers, and equipment carts with wheels which will traverse obstacles while minimizing vibration and excessive impacts.

Patient transport devices such as wheelchairs, gurneys and stretchers may cause discomfort or damage to the occupant during transport over obstacles due to transmission of wheel shocks throughout the mobility device. It is a common occurrence for a wheelchair user to be pitched out of the chair and potentially injured due to an obstruction or irregularity in the pathway. Vibration in the frame of a medical mobility device may cause lower back pain or may trigger spasms in some patients. Hospitals, laboratories, funeral homes, photographers or anyone that requires decreased vibration in a rolling castered device has a need for a suspension system which will absorb or reduce transmission of wheel vibration and deflection to the transported person or goods.

Current casters and suspension systems for wheelchairs, gurneys and other carts and vehicles fail to provide satisfactory shock absorption for the vehicle. There have been attempts to place a steel spring around the stem bolt of the caster assembly in order to accomplish wheel shock absorption. This only allows the wheel to move vertically and does not effectively reduce vibration during forward motion.

SUMMARY OF THE INVENTION

The present invention relates to mobility devices and particularly to suspension devices for wheels on various vehicles including wheelchairs, gurneys, stretchers, wheeled carts, wheeled tripods, casket trailers and the like. The invention replaces conventional rigid caster forks thus allowing the wheel to pivot up and over obstructions and reduce vibration forces transferred to the mobility device. The suspension caster fork invention works on the principle of separating the wheel from the frame of the mobility device by a pivoting mechanism and a dampening medium. The fork minimizes the transfer of kinetic energy and dissipates the energy over time as internal friction. In order to accomplish this, a caster wheel on an axle is attached to a fork that in turn is connected to a pivot axle and supports a dampening member of elastomeric material. The pivot axle connects the fork to a mount designed to affix the assembly to the desired mobility device. The mounting fixture or "upper block" also rests on the elastomeric material. Rigid tabs or mechanical lock outs limit the dynamic range of the elastomeric material. The suspension caster fork is unique because it allows the wheel to travel through an arc thereby enabling the wheel to move up and over obstructions while redirecting and dissipating the energy from the impact. The vehicle's forward momentum and direction is therefore maintained. The invention is designed to be retrofitable to existing vehicles or as original equipment on new mobility devices. This invention may also be designed using flexible material as the structure for the fork thereby integrating both the pivot and vibration absorbing characteristics.

One object of the invention is to provide a caster suspension device which will minimize the force at the point of impact between the stem bolt and the frame of the vehicle on which the suspension device is installed.

It is a further object to provide a caster suspension device which will allow the wheel of the vehicle to move independently accommodating irregular terrain.

It is also an objective to provide a caster suspension device which will maintain the forward momentum and direction of the vehicle while increasing comfort and stability.

These and other objects of the invention will become apparent from examination of the description and claims which follow.

DESCRIPTION OF THE DRAWING FIGURES

FIG. 3 is a rear elevation of the preferred embodiment caster fork invention shown with the dampener in its expanded state.

FIG. 4 is a rear elevation of the preferred embodiment caster fork invention shown in its fully flexed state with the dampener compressed.

FIG. 5 is a side plan view of the preferred embodiment caster fork shown with a wheel mounted thereto.

FIG. 6 is a cross section view of the preferred embodiment invention taken along line A—A of FIG. 5 with the wheel omitted.

FIG. 7 is a rear plan view of an alternate embodiment of the Invention shown with a caster wheel attached thereto.

FIG. 8 is a cross section of the alternate embodiment of FIG. 7 taken along line B—B of FIG. 6 with the caster wheel omitted.

FIG. 9 is a cross section of the alternate embodiment of FIG. 7 shown in its fully flexed state with the dampener of the invention compressed.

DETAILED DESCRIPTION OF THE INVENTION

Figure 1:
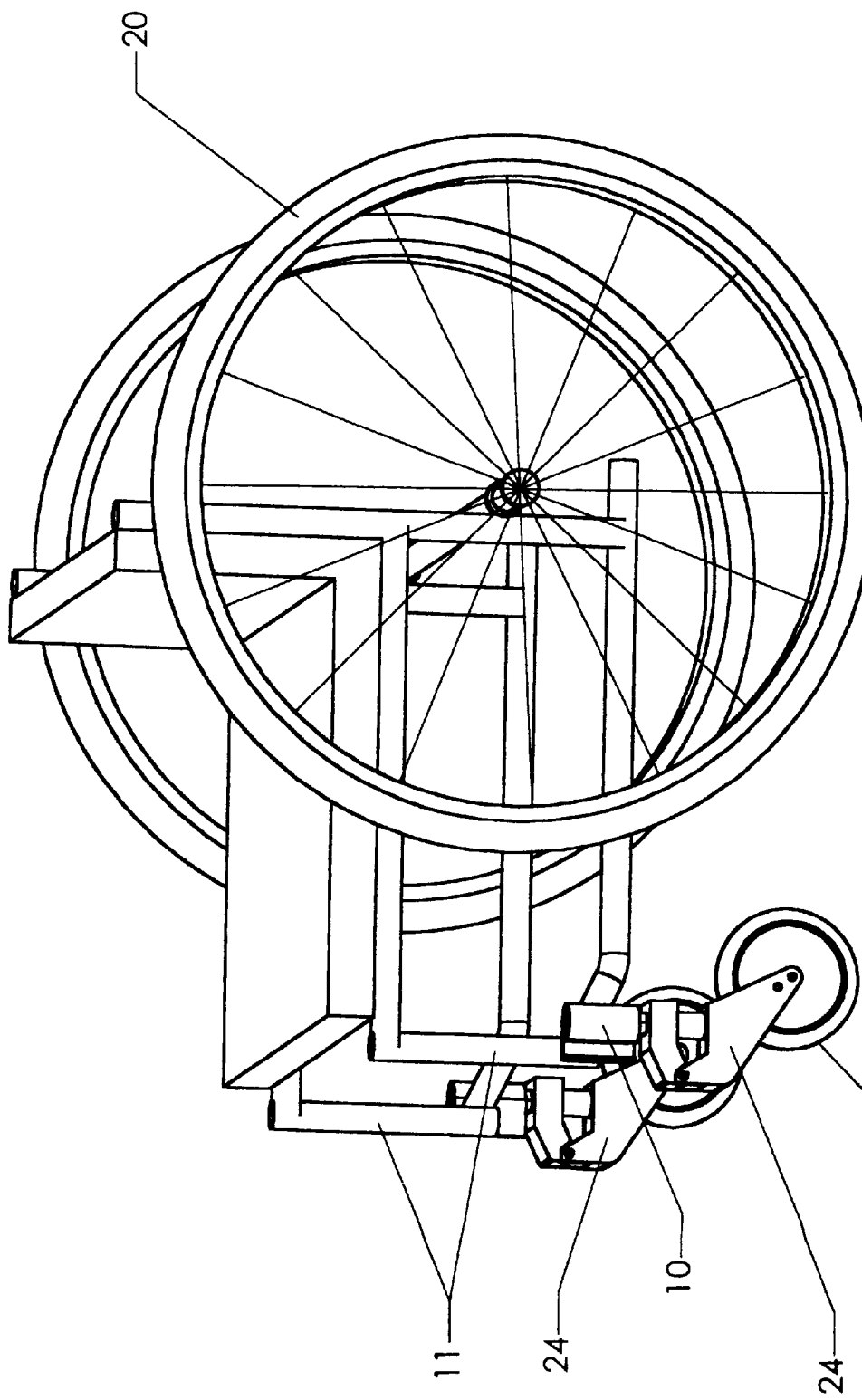
FIG. 1 is a front perspective of a manual wheelchair equipped with the preferred embodiment of the caster fork invention.

Referring to the drawings, FIG. 1 illustrates a typical manual wheelchair 20 having a lower frame 11 to which is mounted a pair of the preferred embodiment invention 24 with each of the inventions 24 having a front caster wheel 8 mounted therewithin. The wheelchair frame 11 has an upright sleeve or barrel housing 10 fixed thereto, typically by welding, which is provided to receive the vertical stem of a typical prior art caster. Each of inventions 24 is mounted to a barrel housing 10 on a side of wheelchair frame 11. It may be seen that caster wheel 8 mounted to invention 24 is not centered on the axis of the barrel housing 10.

Figure 2:
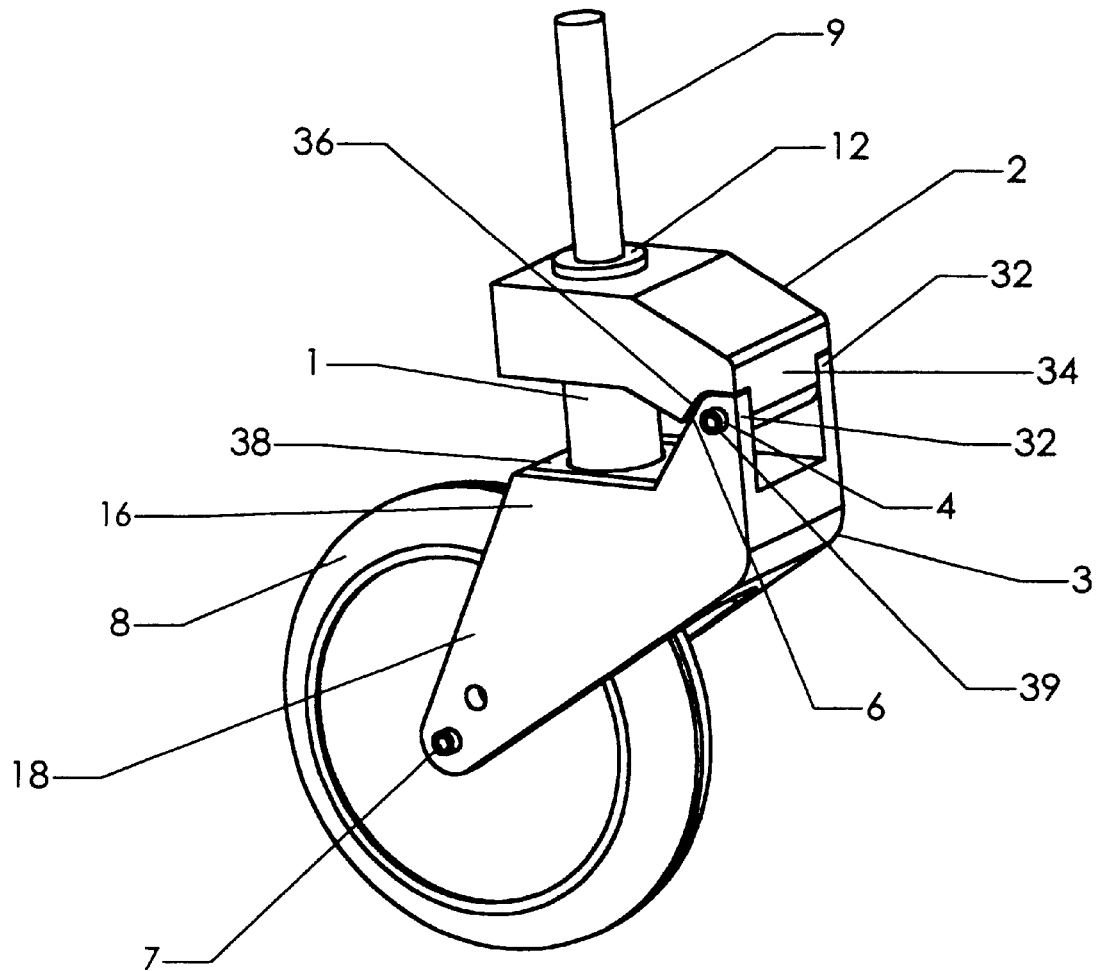
FIG. 2 is a front right perspective of the preferred embodiment of the invention with a caster wheel mounted to it.

Referring now to FIGS. 2–6, details of the structure of invention 24 may be seen. FIG. 2 depicts the invention 24 with a caster wheel 8 mounted thereto and with the stem bolt 9 thereof received in a barrel housing 20 on wheelchair frame 11. It is to be understood that stem bolt 9 is frictionally retained within barrel housing 10 by well known caster stem means or the equivalents thereof, with stem bolt 9 being freely rotatable about its axis within barrel housing 10 while being retained vertically therein. Stem bolt flange 12 is annularly mounted to stem bolt 9 such that stem bolt flange 12 limits the insertion distance of stem bolt 9 within upper block 2 of invention 24. Referring to FIGS. 2–6, it is seen that stem bolt 9 is retained to upper block 2 by lock nut 13 which is received in nut recess 22 on the underside 26 of upper block 2. Upper block 2 is preferably a machined or stamped metal body though a polymeric form may also be employed. Hingedly mounted to upper block 2 by forward pivot pin 4 is fork member 3 which comprises an upper fork body 16 and a pair of spaced apart tines 18 depending from upper fork body 16. A caster wheel 8 is receivable between tines 18 and may be mounted thereto by wheel axle 7 which is received in first axle opening 17 or alternate axle opening 19 as desired, depending on the diameter of caster wheel 8.

Fork body 16 is provided with ears 32 which are spaced apart to receive tongue 34 which depends from upper block 2. Ears 32 and tongue 34 have horizontal axleways 39 therethrough which when aligned will receive pivot pin 4.

Upper block 2 is provided with first bearing surfaces 6 on the underside thereof on opposing sides of tongue 34 which, when invention 24 is in a unflexed state, will be spaced apart from first opposing bearing surfaces 36 of ears 32. As seen in FIG. 4, as the invention is flexed and dampener 1 is compressed, first bearing surfaces 6 touchingly engage first opposing bearing surfaces 36 to limit the pivot of fork member 3 about pivot pin 4. When invention 24 returns to its unflexed state, by the urging of dampener 1, second bearing surfaces 28 of underside of upper block 2 are in touching engagement with second opposing bearing surfaces 30 of ears 32 of fork member 3. Hence, the range of extension of invention 24 is limited to prevent the spatial separation of underside 26 of upper block 2 from upper surface 38 of fork member 3 to an extent at which dampener 1 could escape from its position between upper block 2 and fork member 3.

It should be further understood that in the preferred embodiment, upper body 2 is provided with a countersunk recess 14 which is coaxial with nut recess 22. Fork member 3 is provided with an opposing recess 40 on its upper surface 38 which corresponds to countersunk recess 14 such that the upper end 42 of dampener 1 is received in countersunk recess 14 and lower end 44 of dampener 1 is received in opposing recess 40. Preferably dampener 1 is an elastomeric material which is cylindrical in shape and which is approximately one to two inches long and approximately one inch in diameter. In the preferred embodiment, dampener 1 is formed of VIBRATHANE™ polyurethane supplied by Uniroyal Co. It can be seen that in the preferred embodiment, the axis of dampener 1 is substantially aligned with the axis of stem bolt 9 while pivot pin 4 is spaced apart in a first lateral direction from said axis of stem bolt 9, and axle openings 17 and 19 are spaced apart from said axis of stem bolt 9 in an opposing lateral direction.

Wheel axle 7 is disposed along an imaginary line directed at approximately forty-five degrees from vertical, said imaginary line passing through pivot pin 4. The horizontal distance from wheel axle 7 to pivot pin 4 is approximately twice the horizontal distance from pivot pin 4 to the vertical axis of dampener 1.

It should be understood that ears 32 of fork member 3 and tongue 34 of upper block 2 lead invention 24 as it is moved, with the caster wheel 8 trailing. Because stem bolt 9 may axially rotate in barrel housing 10, when a change in the direction of travel of wheelchair 20 occurs, the resistance of the trailing caster wheel 8 will effectuate a rotation of invention 24 about the axis of stem bolt 9 such that ears 32 and tongue 34 will tend to remain as the leading elements of invention 24 as wheel 8 turns. As wheel 8 encounters obstacles such as pavement separations and discrepancies or loose pebbles or other debris, the flexion of fork member 3 relative to upper block 2 will dampen the impact experienced by the wheelchair user. When fork assembly 3 manually pivots toward upper block 2, dampener is compressed about one-half inch in vertical height.

Referring now to FIGS. 7–9, an alternative embodiment of the suspension system invention is illustrated. The alternate embodiment invention 124 is provided with a stem bolt 109 mounted to an upper block 102 which is pivotally mounted to a lower fork element 103 which pivots over a limited range about a horizontally disposed pivot pin 104. Upper block 102 is provided with a recess 150 therewithin into which is placed a cylindrical polyurethane spring element 101 which is captured between the underside 126 of upper block 102 and the top side 138 of fork element 103. Top side 138 is disposed to move within recess 150 as fork member 103 pivots about pivot pin 104.

Shelf 106 on the rear 120 of fork member 103 approaches lower surface 136 of rear wall 134 of upper block 102 as dampener 101 is compressed until it reaches an abutting engagement with lower surface 136 thereby limiting the flexure of alternate embodiment 124. As best seen in FIGS. 8 and 9, rear face 105 of fork member 103 abuts inner face 130 of rear wall 134 of upper body block 102 when dampener 101 is relaxed, thereby restraining the extension of alternate embodiment 124. It can be seen that forks 118 of fork member 103 may be provided with alternate axle openings 117 and 119 to accommodate varying wheel sizes to be mounted to alternate embodiment 124.

In the alternate embodiment of FIGS. 7 and 9, dampener 101 comprises an elongate cylinder disposed such that its axis is horizontal, the dampener 101 being an elastomeric polymer such as polyurethane sized to substantially fill recess 150. When fork member 103 is pivoted toward upper block 102 until stopped by abutment of shelf 106 against lower surface 136, dampener 101 is compressed about three-fourths inch in vertical height.

Having described the invention, I claim:

1. A swiveling wheel suspension system for a transport device comprising an upper member mounted to said transport device, said upper member rotatable upon said transport device about a substantially vertical axis, a lower member pivotally mounted to said upper member and having a downwardly extending pair of fork elements thereon, a wheel mounted between said fork elements, said lower member pivotable upon said upper member about a horizontally disposed pivot axle, said pivot axle spaced apart laterally from said vertical axis in a first direction, an elastomeric member disposed between said upper member and said lower member, means to retain said elastomeric member between said upper member and said lower member, said wheel having a central axis, said central axis of said wheel spaced apart from said vertical axis in a lateral direction opposed to said first direction, stop means provided on at least one of said upper member and said lower member to limit the range of motion of said lower member about said pivot axle, said stop means comprising an outwardly extending shelf on at least one of said upper member and said lower member and an opposing bearing surface on said other of said upper member and said lower member, said bearing surface abutting said shelf when said elastomeric member is substantially compressed.

2. The wheel suspension system of claim 1 wherein said upper member has a recess thereunder, said lower member having an upper face, said upper face disposed within said recess of said upper member, said elastomeric member disposed above said upper face and touchingly engaged therewith, said upper face applying compression force to said elastomeric member when said lower member is pivoted toward said upper member.

3. The wheel suspension system of claim 2 wherein a plurality of opposing pairs of wheel axle mounting elements is disposed on said fork elements, said central axis of said wheel selectively disposed between one of said pairs of wheel axle mounting elements.

4. The wheel suspension system of claim 1 wherein said elastomeric member comprises a polyurethane cylinder disposed substantially horizontally and axially parallel to said pivot axle.

5. The wheel suspension system of claim 1 wherein said means to retain said elastomeric member between said upper member and said lower member comprises a vertical outer surface on said lower member and an inwardly directed surface on said upper member, said vertical outer surface abutting said inwardly directed surface when said elastomeric member is fully relaxed.

6. A wheel suspension system for a wheelchair, stretcher, or gurney having a frame, comprising a first body mountable to said frame of said wheelchair, gurney, or stretcher and rotatable thereon about a substantially vertical axis, a second body pivotally mounted to the first body, said second body pivotable on said first body about a substantially horizontal axis of pivot, said axis of pivot laterally offset from the substantially vertical axis of rotation of said first body, said second body having a wheel vertically mounted thereto by an axle, a resilient body retained between said first body and said second body, said resilient body compressed when said second body pivots about said axis of pivot toward said first body, one of said first and said second bodies has a tongue extending angularly toward said other of said first and second members, the other of said first and said second bodies has a pair of spaced apart ears extending angularly toward said other of said first and said second bodies, said tongue receivable between said ears, said axis of pivot comprising a horizontally disposed pin passing through said ears and said tongue, said tongue has a bearing surface disposed toward said other of said first and second bodies, at least one of said ears having a bearing surface disposed to face said bearing surface of said tongue, said bearing surface of said tongue coming into abutment with said bearing surface of said at least one of said ears as said resilient body is compressed.

7. The wheel suspension system of claim 6 wherein said first body has a substantially vertical stem extending thereabove, said stem having an axis, said first body rotatable about said axis of said stem, said resilient body of cylindrical shape and having a vertical axis, said axis of said resilient body substantially aligned with the axis of said stem, said axle of said wheel laterally offset from the axis of rotation of said stem.

8. The wheel suspension fork of claim 7 wherein said means to restrict the range of pivot further comprises a second bearing surface on said at least one ear and a second opposing surface on said pivot mount portion, said second bearing surface coming into abutment with said second opposing surface as said lower body pivots away from said upper body.

9. In a wheel suspension fork for a mobile device, the fork having a stem vertically disposed thereon and having a wheel rotatable thereon about a horizontal axle, the improvement comprising said stem having an upper body mounted therebelow, said stem having a vertical axis, said upper body having a horizontally disposed pivot axle mounted thereto, said pivot axle laterally spaced apart from the axis of said stem in a first direction, a lower body pivotally mounted to said first body by said pivot axle, said lower body having said wheel mounted thereto, an elastomeric element disposed between said upper body and said lower body, said elastomeric element urging said lower body away from said upper body, said upper body has a horizontal portion, said horizontal portion mounted to said stem, said upper body having a pivot mount portion, said pivot mount portion depending angularly downward from said horizontal portion, said lower body having an upper segment and fork elements depending downwardly from said upper segment, said upper segment of said lower body pivotably mounted to said pivot mount portion of said upper body, said elastomeric member disposed between said horizontal portion of said upper body and said lower body, said upper segment of said lower body has a horizontal upper surface, said upper segment including at least one ear extending angularly upward from said upper surface thereof, said at least one ear pivotably mounted to said pivot mount portion of said upper body, said at least one ear comprising a first bearing surface thereon, said pivot mount portion comprising a first opposing bearing surface thereon, said first bearing surface coming into abutment with said first opposing surface as said lower body pivots toward said upper body.

\* \* \* \* \*